Aug. 31, 1954   C. JACKSON   2,688,102
ELECTRIC VIBRATING MOTOR
Filed Jan. 29, 1953   2 Sheets-Sheet 1

INVENTOR.
Corwill Jackson
BY
ATTORNEY.

Aug. 31, 1954 C. JACKSON 2,688,102
ELECTRIC VIBRATING MOTOR
Filed Jan. 29, 1953 2 Sheets—Sheet 2

INVENTOR.
Corwill Jackson
BY
O'M A Earl
ATTORNEY.

Patented Aug. 31, 1954

2,688,102

UNITED STATES PATENT OFFICE 2,688,102

ELECTRIC VIBRATING MOTOR

Corwill Jackson, Ludington, Mich., assignor to Jackson Vibrators, Inc., Ludington, Mich.

Application January 29, 1953, Serial No. 334,008

19 Claims. (Cl. 310—81)

1

This invention relates to improvements in an electric vibrating motor.

The main objects of this invention are:

First, to provide an electric motor in which the parts are completely enclosed in a housing with efficient lubricating means permitting the use of a fluid lubricant as distinguished from packing with grease, and one which permits the renewal of the lubricant in the field without the opening of the housing and exposing the interior of the housing or the operating parts to dust, grit and dirt.

Second, to provide an electric vibrating motor with an externally sealed lubricant reservoir having a restricted connection to the interior of the motor, the parts being so arranged that the contents of the reservoir are subjected to high frequency vibrations which tend to emulsify the lubricant and create pressure within the reservoir, the pressure tending to feed the oil in restricted quantities into the motor housing.

Third, to provide an electric motor with improved lubricating means in which the supply of lubricant may be renewed without exposing the lubricant to dust or dirt.

Fourth, to provide a structure having these advantages which is compact and may be roughly handled without likelihood of injury thereto.

Objects relating to details and economies of the invention will appear from the description to follow. The invention is defined and pointed out in the claims.

A preferred embodiment of the invention is illustrated in the accompanying drawings, in which.

Figure 1:
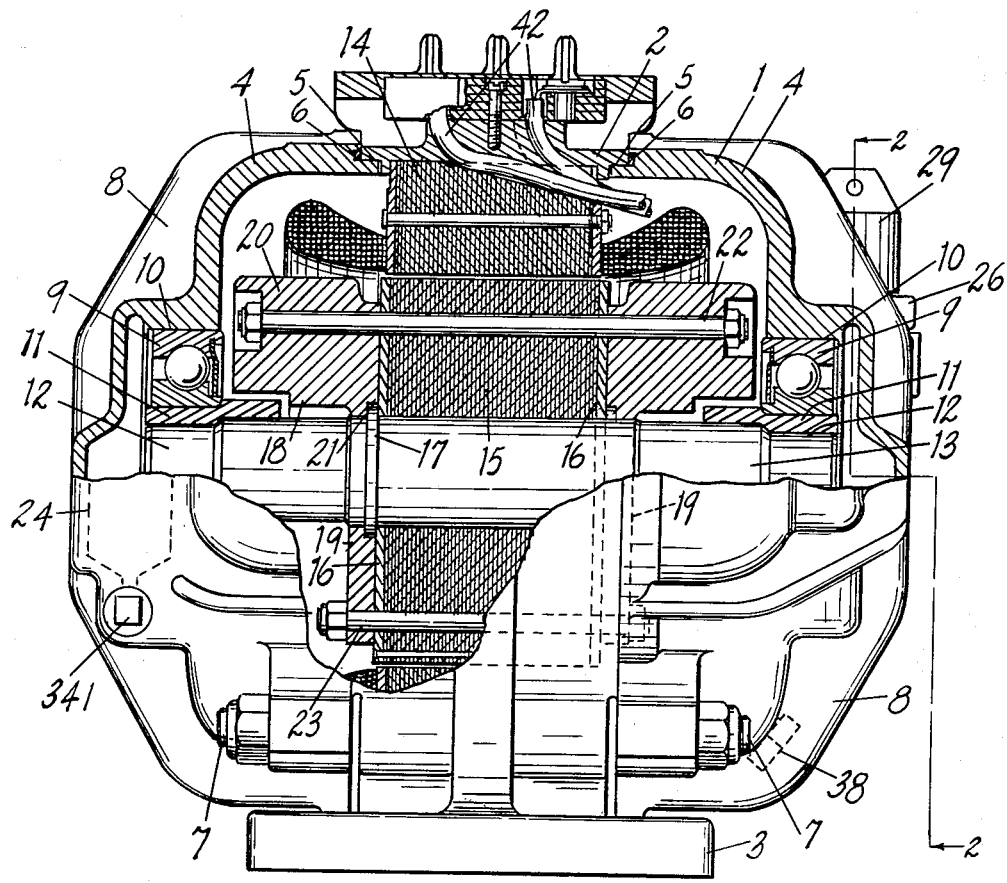
Fig. 1 is a fragmentary side elevational view of an electric vibrating motor embodying my invention mainly in longitudinal section on a line corresponding to line 1—1 of Fig. 2.
Figure 4:
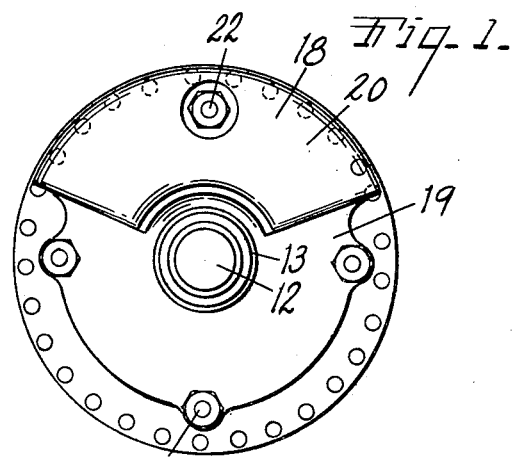
Fig. 4 is an end view of the unbalanced rotor.
Figure 2:
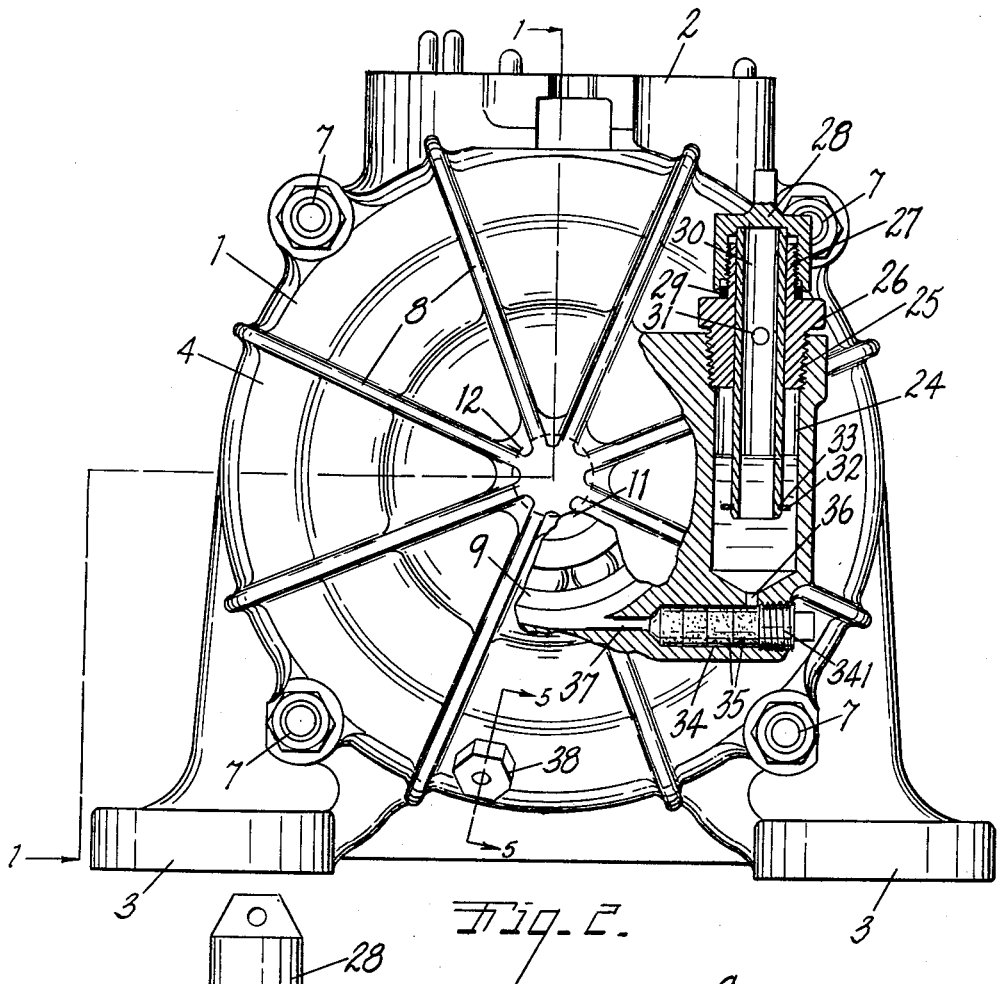
Fig. 2 is an end elevational view looking from the right of Fig. 1 broken away and partially in vertical section on a line corresponding to line 2—2 of Fig. 1.

The electric vibrating motor of this invention is particularly designed for use in the vibratory placement of concrete and other materials and in the placement of ballast, foundation material, filling and the like. The motor is especially designed for what is commonly designated as heavy duty, that is, a motor designed to vibrate relatively heavy placement apparatus at high frequency.

I have not illustrated the application of the motor of my invention to a particular implement or apparatus but attention is directed to my Patent Number 2,482,111, September 20, 1949, as illustrating one use and Patent Number 2,488,915, November 22, 1949, illustrating another use. As stated, it is adapted for various apparatus in the vibratory placement of material.

In the embodiment of my invention illustrated, the motor housing designated generally by the numeral 1 comprises an intermediate housing member 2 of generally annular shape and provided with a base 3 having foot portions adapted for attachment of the motor to the part to be vibrated. The chambered end members 4 complement the intermediate member in providing a closed housing, the ends of the intermediate member and the end members having stepped joints 5 provided with packings 6. The bolts 7 secure the end members to the intermediate member.

The end members are provided with radial reinforcing and heat radiating fins 8. The end members are formed interiorly to receive the roller bearings designated generally by the numeral 9 and comprising outer ball races within the bearing recesses 10, inner ball races and the bearing balls. The bearings, however, form no part of my present invention. The bearings open to the housing or are exposed interiorly to the housing and coact with the bushings 11 on the journal portions 12 of the rotor shaft 13.

The motor illustrated is of the so-called squirrel cage type, the stator designated generally by the numeral 14 being supportedly mounted within the intermediate housing member. The stator is conventionally shown as it forms no part of my present invention.

The armature unit designated generally by the numeral 15 is mounted on the shaft 13 and includes end plates 16. The shaft has an annular rib 17 against which one of the side plates 16 is supported. The rotor unbalancing members 18 have disc or plate-like body portions 19 and unbalancing weight portions 20. These unbalancing members 19 are supportedly mounted on the shaft and one of them recessed at 21 to receive the rib 17 on the shaft. The weights 20 are disposed in alignment and the clamping bolt 22 is arranged therethrough. Other clamping or tie bolts 23 are disposed through the armature and the members 19 clamping these parts securely together.

The housing is a sealed or closed housing and is adapted to retain lubricant except as it may be discharged through a drain opening hereinafter described. As I have pointed out, these motors are operated under very severe working conditions as to rough handling, dirt, dust and the like. To provide efficient lubrication and prevent the introduction of dirt and grit, I form one end member with a bore-like lubricant reservoir 24. This reservoir is vertically disposed and is internally threaded at 25 to receive the closure plug 26 which is threaded into the upper end of the reservoir chamber, the thread portion of the plug being preferably tapered. The plug is tubular and has an externally threaded nipple portion 27 receiving the filling cap 28. A gasket 29 is provided for the filling cap.

Figure 3:
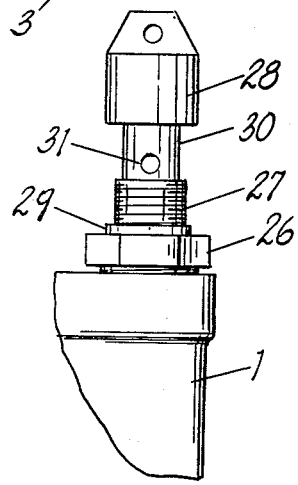
Fig. 3 is a fragmentary view showing lubricant filler assembly in restricted or filling position.

A filling tube 30 is secured to the filling cap and is slidable within the closure plug. The filling tube has a side opening 31 through which lubricant can be introduced when the filler cap is released and the tube withdrawn as shown in Fig. 3. The snap ring 32 engaged in the groove 33 at the inner end of the filler tube limits the withdrawal of the filler tube. With this arrangement lubricant may be introduced into the reservoir or lubricant chamber without opening the same in a manner that it is likely to permit the entrance of dirt or grit.

The lubricant reservoir is connected to the interior of the housing through the filter chamber 34 which is provided with plugs of filtering material 35. The filter chamber is connected to the lubricant reservoir by the restricted opening 36 and to the interior of the housing by the restricted passage 37. The filtering material 35 serves a double purpose of filtering the lubricant, regulating the passage of the lubricant from the supply reservoir to the interior of the housing.

Figure 5:
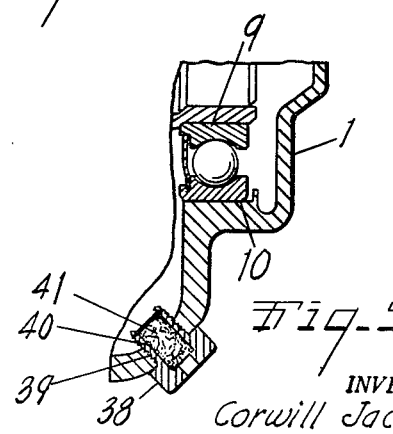
Fig. 5 is a fragmentary section on line 5—5 of Fig. 2.

The chamber 34 is provided with a closure plug 341 at its outer end which permits the insertion of the filtering material and the withdrawal thereof as occasion may require. A drain opening for spent lubricant (see Fig. 5) is formed through the plug 38, threaded into an opening 39 in the housing and chambered at 40 to receive the filtering or screening material 41. The primary purpose of this material 41 is to prevent the entrance of dust or dirt into the housing and not to filter the spent oil discharged. In effect it constitutes a screen but a plug of fibrous material such as wool yarn is found to be highly satisfactory.

It will be noted that the lubricant reservoir and the housing are entirely sealed or closed except as the housing is vented for the escape of the spent lubricant. With the parts thus arranged, when the motor is operating the lubricant in the lubricant reservoir is violently agitated and tends to emulsify, thereby creating a slight pressure within the reservoir and this pressure tends to force the oil through the filtering material in the filtering chamber. This action overcomes the slight vacuum which results in the oil chamber and the lubricant reservoir as the lubricant is discharged therefrom.

Motors embodying my invention may be kept in continuous operation for long periods of time and it is not necessary to stop the same to replenish the lubricant. In operation the unbalanced rotor tends to follow an orbital path which is found to efficiently distribute the lubricant and an ample supply thereof is thrown into the bearings and it is not necessary that the housing be filled with lubricant in order to provide efficient lubrication.

The electrical connections are indicated at 42. I have not illustrated their connections to the stator. As stated, the details of the stator form no part of this invention but that illustrated is of the squirrel cage induction type.

I have illustrated and described my invention in a highly practical embodiment thereof. I have not attempted to illustrate or describe other embodiments or adaptations as it is believed that this disclosure will enable those skilled in the art to embody or adapt my invention as may be desired.

Having thus described my invention, what I claim as new and desire to secure by Letters Patent is:

1. An electric vibrating motor comprising an intermediate housing member provided with a base, chambered end members complementing said intermediate housing member and provided with ball bearings, a stator mounted in said intermediate member, a rotor shaft mounted in said bearings, an armature unit on said shaft including end plates, said shaft having an annular rib with which one of said end plates is supportedly engaged, unbalancing members sleeved upon said shaft in supported engagement therewith and on the outer sides of said end plates, said members being provided with axially aligned rotor unbalancing weights, one of which has an annular recess therein receiving said rib on said shaft, tie rods arranged through said armature unit and said unbalancing members, one of said tie rods being arranged through said unbalancing weights, and bolts detachably connecting said housing end members to said housing intermediate member.

2. An electric vibrating motor comprising an intermediate housing member provided with a base, chambered end members complementing said intermediate housing member and provided with ball bearings, a stator mounted in said intermediate member, a rotor shaft mounted in said bearings, an armature unit on said shaft including end plates, unbalancing members sleeved upon said shaft in supported engagement therewith and on the outer sides of said end plates, said members being provided with axially aligned rotor unbalancing weights, tie rods arranged through said armature unit and said unbalancing members, one of said tie rods being arranged through said unbalancing weights, and bolts detachably connecting said housing end members to said housing intermediate member.

3. An electric vibrating motor comprising an intermediate housing member provided with a base, end members provided with ball bearings, a stator mounted in said intermediate member, a rotor shaft mounted in said bearings, an armature unit on said shaft including end plates, said shaft having a projection with which one of said end plates is supportedly engaged, rotor unbalancing members sleeved upon said shaft in supported engagement therewith and at the outer sides of said end plates, one member having a recess therein receiving said projection on said shaft, said members being provided with rotor unbalancing weights, and tie rods arranged through said armature unit and said unbalancing members.

4. An electric vibrating motor comprising an intermediate housing member provided with a base, end members provided with ball bearings, a stator mounted in said intermediate member, a rotor shaft mounted in said bearings, an armature unit on said shaft including end plates, rotor unbalancing members sleeved upon said shaft in supported engagement therewith and at the outer sides of said end plates, said members being provided with rotor unbalancing weights, and tie rods arranged through said armature unit and said unbalancing members.

5. An electric vibrating motor comprising an intermediate housing member provided with a base, end members provided with ball bearings, a stator mounted in said intermediate member, a rotor shaft mounted in said bearings, an armature unit on said shaft, rotor unbalancing members sleeved upon said shaft in supported engagement therewith and at the ends of said armature unit, said members being provided with axially aligned unbalancing weights, and tie rods connecting said rotor unbalancing members, one of said tie rods being arranged through said unbalancing weights.

6. An electric vibrating motor comprising an intermediate housing member provided with a base, end members provided with ball bearings, a stator mounted in said intermediate member, a rotor shaft mounted in said bearings, an armature unit on said shaft, rotor unbalancing members sleeved upon said shaft in supported engagement therewith and at the ends of said armature unit, said members being provided with unbalancing weights, and tie rods connecting said rotor unbalancing members.

7. In an electric vibrating motor, the combination of a closed housing comprising an intermediate housing member and chambered end housing members, said end members being provided with ball bearings, said housing being closed, an unbalanced rotor mounted in said bearings, a lubricant supply reservoir in one of said end members, a tubular closure plug threaded into the outer end of said reservoir and provided with a threaded nipple at its outer end, a filler cap threaded upon said nipple, said closure plug and filler cap sealing said reservoir when they are closed, a filling tube carried by said filler cap and reciprocable within said closure plug and having a side filling opening exposed when the filler cap is released and the tube partially withdrawn from said closure plug, a stop limiting the withdrawal movement of said filing tube, a filter chamber disposed below said lubricant reservoir and having a restricted inlet connection thereto, said filter chamber having a restricted discharge to the interior of said housing and being provided with filtering material extending across the discharge of said lubricant reservoir, said filter chamber opening to the outer side of the housing and being provided with a removable closure plug, and a lubricant drain opening at the bottom of the housing provided with a drain plug having a passage therethrough with a packing of filtering material in the passage acting to prevent entrance of foreign matter to the housing.

8. In an electric vibrating motor, the combination of a closed housing comprising an intermediate housing member and chambered end housing members, said end members being provided with ball bearings, said housing being closed, an unbalanced rotor mounted in said bearings, a lubricant supply reservoir in one of said end members, a tubular closure plug threaded into the outer end of said reservoir and provided with a threaded nipple at its outer end, a filler cap threaded upon said nipple, said closure plug and filler cap sealing said reservoir when they are closed, a filling tube carried by said filler cap and reciprocable within said closure plug and having a side filling opening exposed when the filler cap is released and the tube partially withdrawn from said closure plug, a stop limiting the withdrawal movement of said filling tube, a filter chamber disposed below said lubricant reservoir and having a restricted inlet connection thereto, said filter chamber having a restricted discharge to the interior of said housing and being provided with filtering material extending across the discharge of said lubricant reservoir, said filter chamber opening to the outer side of the housing and being provided with a removable closure plug.

9. In an electric motor, the combination of a closed housing comprising an intermediate housing member and chambered end housing members, said housing being closed, said end members being provided with ball bearings, a rotor mounted in said bearings, a lubricant supply reservoir in one of said end members, a tubular closure plug threaded into the outer end of said reservoir and provided with a threaded nipple at its outer end, a filler cap threaded upon said nipple, said closure plug and filler cap sealing said reservoir when they are closed, a filling tube carried by said filler cap and reciprocable within said closure plug and having a side filling opening exposed when the filler cap is released and the tube partially withdrawn from said closure plug, means limiting the withdrawal of said filling tube, a filter chamber having a restricted inlet connection to said lubricant reservoir and a restricted discharge to the interior of said housing and being provided with filtering material restraining the passage of lubricant therethrough.

10. In an electric motor, the combination of a closed housing comprising an intermediate housing member and chambered end housing members, said housing being closed, said end members being provided with ball bearings, a rotor mounted in said bearings, a lubricant supply reservoir in one of said end members, a tubular closure plug for the outer end of said reservoir, a filler cap detachably mounted on said closure plug, said closure plug and filler cap sealing said reservoir when they are closed, a filling tube carried by said filler cap and reciprocable within said closure plug and having a filling opening exposed when the filler cap is released and the tube partially withdrawn from said closure plug, and a filter chamber having a restricted inlet connection to said lubricant reservoir and a restricted discharge to the interior of said housing and being provided with filtering material restraining the passage of lubricant therethrough.

11. In an electric motor, the combination of a housing having rotor bearings enclosed therein and exposed to the interior thereof, a lubricant reservoir in the wall of the housing, a rotor mounted in said bearings, a tubular closure for the upper end of said reservoir, a releasable filler cap on said tubular closure coacting therewith to seal the reservoir when the closure and cap are closed, a filling tube carried by said filler cap and reciprocable within said closure and adapted to receive lubricant when partially withdrawn from the closure member, a filter chamber having a restricted inlet connection to said reservoir and a restricted discharge connection to the interior of the housing and being provided with filtering material, said filtering chamber opening to the outer side of the housing and being provided with a closure plug facilitating introduction and removal of the filtering material therefrom, and a drain for said housing provided with filtering material acting to prevent the entrance of foreign matter to the housing.

12. In an electric motor, the combination of a housing having rotor bearings enclosed therein and exposed to the interior thereof, a lubricant reservoir in the wall of the housing, a rotor mounted in said bearings, a tubular closure for the upper end of said reservoir, a releasable filler cap on said tubular closure coacting therewith to seal the reservoir when the closure and cap are closed, a filling tube carried by said filler cap and reciprocable within said closure and adapted to receive lubricant when partially withdrawn from the closure member, a filter chamber having a restricted inlet connection to said reservoir and a restricted discharge connection to the interior of the housing and being provided with filtering material.

13. In an electric motor, the combination of a housing having rotor bearings enclosed therein and exposed to the interior thereof, a lubricant reservoir, a rotor mounted in said bearings, a filter chamber having a restricted inlet connection to said reservoir and a restricted discharge connection to the interior of the housing and being provided with filtering material, said filtering chamber opening to the outer side of the housing and being provided with a closure plug facilitating introduction and removal of the filtering material therefrom, and a drain for said housing provided with filtering material acting to prevent the entrance of foreign matter to the housing.

14. In an electric motor, the combination of a housing having rotor bearings enclosed therein and exposed to the interior thereof, a lubricant reservoir, a rotor mounted in said bearings, and a filter chamber having a restricted inlet connection to said reservoir and a restricted discharge connection to the interior of the housing and being provided with filtering material.

15. In an electric vibrating motor, the combination of a closed housing having rotor bearings enclosed therein and exposed to the interior thereof, a lubricant reservoir in the wall of the housing, an unbalanced rotor mounted in said bearings, a tubular closure for the upper end of said reservoir, a releasable filler cap on said tubular closure coacting therewith to seal the reservoir when the closure and cap are closed, a filling tube carried by said filler cap and reciprocable within said closure and adapted to receive lubricant when partially withdrawn from the closure member, and a restricted connection from said reservoir to the interior of the housing.

16. An electric vibrating motor comprising a closed housing having rotor bearings enclosed therein and opening to the interior thereof, an unbalanced rotor mounted in said bearings, a sealed lubricant reservoir embodied in the housing, a restricted filtering connection from said lubricant reservoir to the interior of the housing, and a drain for the housing provided with filtering material acting to prevent the entrance of foreign matter to the housing through the drain opening.

17. An electric vibrating motor comprising a closed housing having rotor bearings enclosed therein and opening to the interior thereof, an unbalanced rotor mounted in said bearings, a sealed lubricant reservoir embodied in the housing, and a restricted filtering connection from said lubricant reservoir to the interior of the housing.

18. In an electric vibrating motor, the combination of a closed housing having bearings enclosed therein exposed to the interior thereof, an unbalanced rotor mounted in said bearings, and a sealed lubricant reservoir subject to the vibrations of the housing and having a restricted delivery connection to said housing, such connection including filtering material of a density restraining free flow of lubricant therethrough, the vibrations to which the lubricant reservoir is subjected acting to agitate and tending to emulsify the lubricant and create pressure within the reservoir acting to force the oil through the filtering material.

19. An electric vibrating motor comprising a closed housing and having rotor bearings enclosed therein and exposed to the interior thereof, an externally sealed lubricant reservoir in the wall of the housing, an unbalanced rotor mounted in said bearings, and a delivery connection from said reservoir to the interior of said housing provided with filtering material of a density acting to substantially restrain gravity flow of lubricant therethrough, the unbalanced rotor when the motor is running acting to vibrate the housing at high frequency, such vibration tending to emulsify the lubricant and create pressure within the reservoir tending to force the oil through the filtering material.

References Cited in the file of this patent

UNITED STATES PATENTS

| Number | Name | Date |
| --- | --- | --- |
| 1,119,741 | Alexanderson | Dec. 1, 1914 |
| 1,316,874 | Bodey | Sept. 23, 1919 |
| 2,001,799 | Seyfried | May 21, 1935 |